Dec. 17, 1963  O. PLETSCHER  3,114,434
RIM BRAKE
Filed Sept. 19, 1960  5 Sheets-Sheet 1
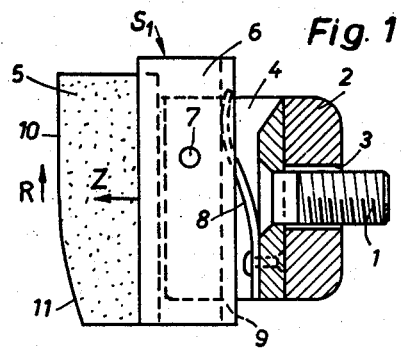
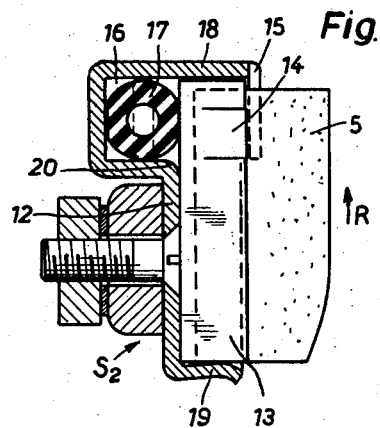
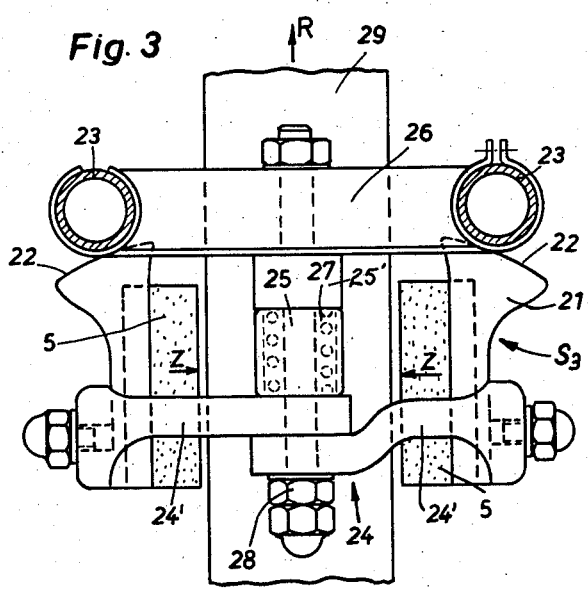

Dec. 17, 1963 O. PLETSCHER 3,114,434
RIM BRAKE
Filed Sept. 19, 1960 5 Sheets-Sheet 2
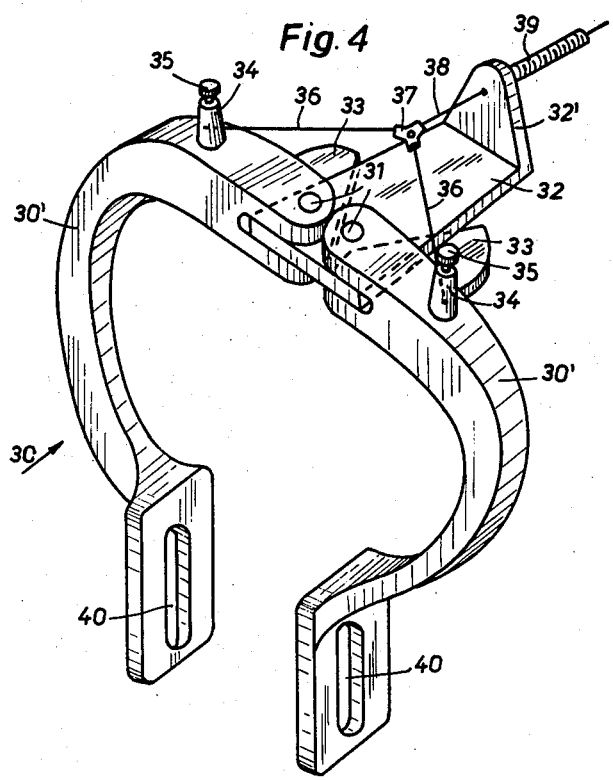
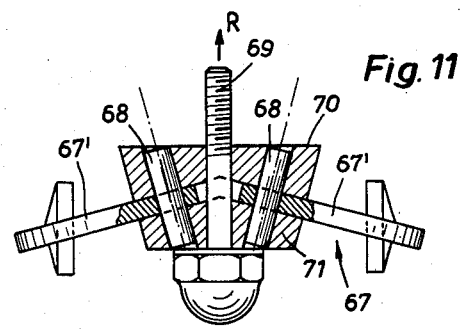

Dec. 17, 1963     O. PLETSCHER     3,114,434
RIM BRAKE

Filed Sept. 19, 1960     5 Sheets-Sheet 3

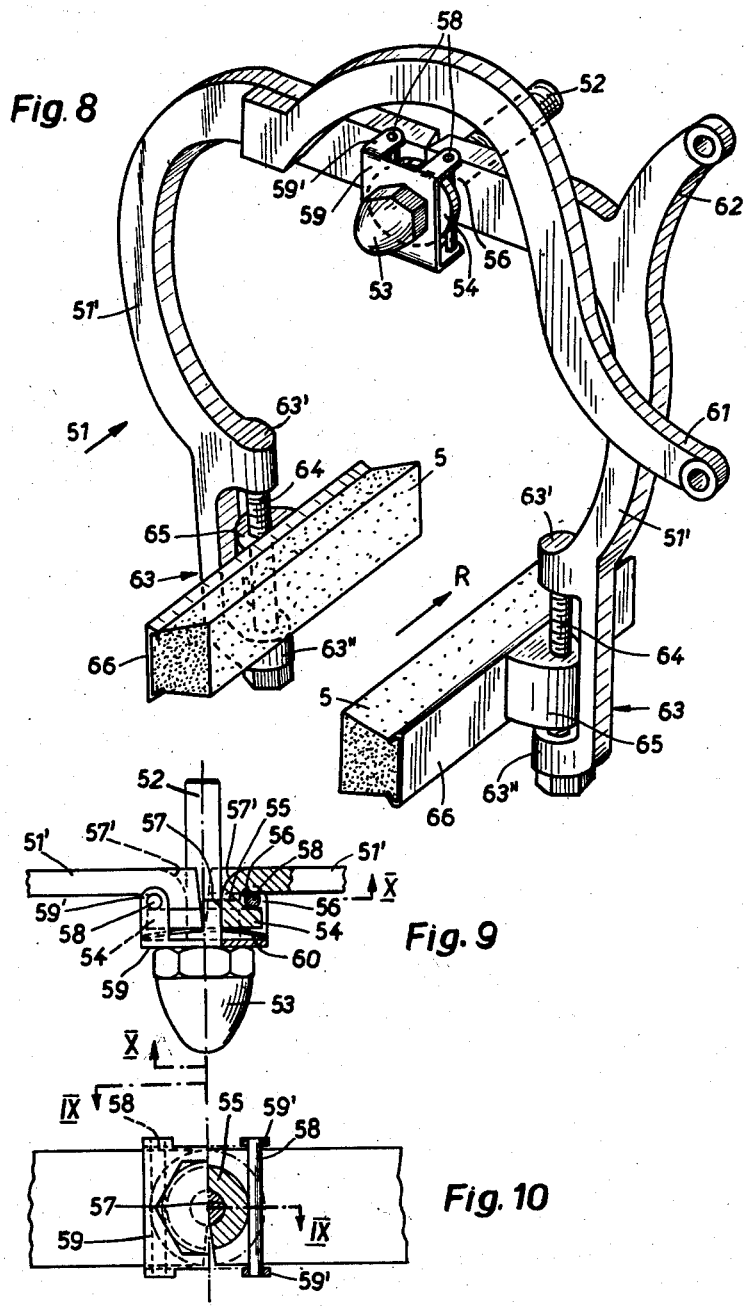

Dec. 17, 1963   O. PLETSCHER   3,114,434
RIM BRAKE
Filed Sept. 19, 1960   5 Sheets-Sheet 5
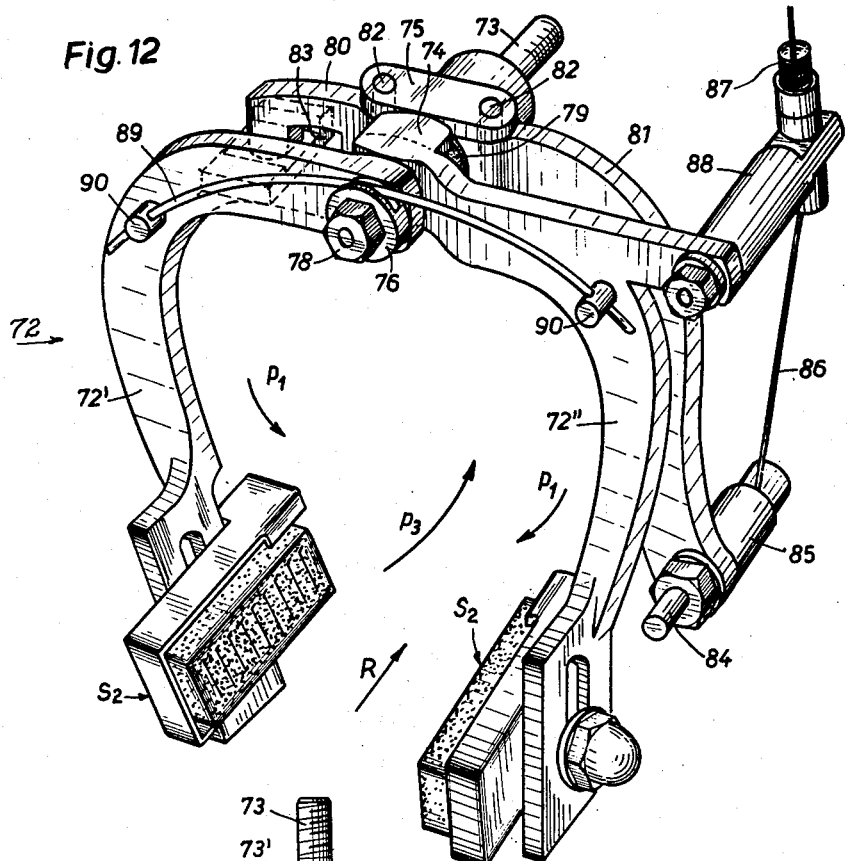
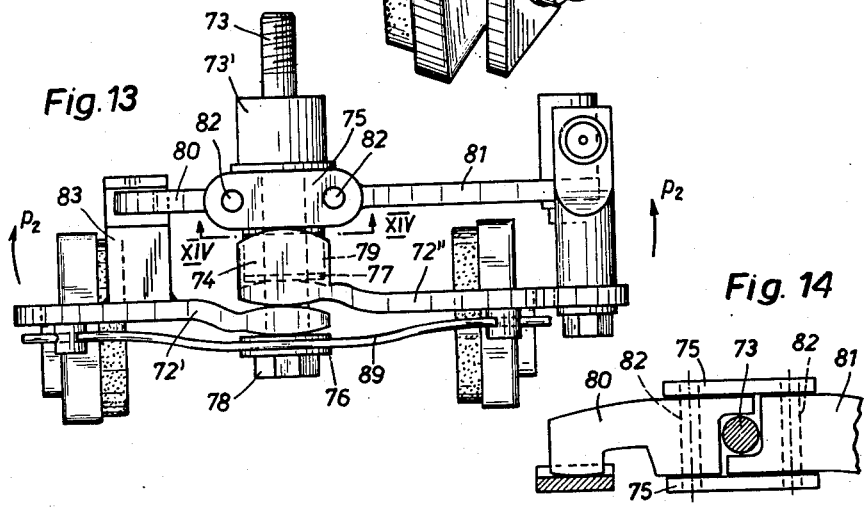
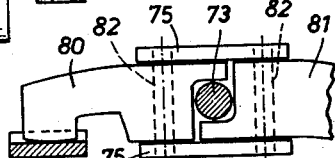

United States Patent Office 3,114,434
Patented Dec. 17, 1963

3,114,434
RIM BRAKE
Oskar Pletscher, Marthalen, Zurich, Switzerland, assignor to Gebrüder Pletscher, Zurich, Switzerland
Filed Sept. 19, 1960, Ser. No. 56,802
Claims priority, application Germany Sept. 18, 1959
4 Claims. (Cl. 188—24)

The present invention relates to rim brakes and more particularly to rim brakes of the type having brake shoes cooperating in a jaw-like manner in pairs as widely used for bicycles.

In such brakes the brake shoes are applied to the felloe or rim in a direction parallel to the wheel axle and then clasped under the action of the force of actuation, whereby the actual braking power is solely a function of the force of actuation. The brake shoes are generally applied by means of a lever system in the form of hinged rocker arms and actuated by a handle acting through a Bowden cable. Under these circumstances a substantial part of the already small force of actuation is lost due to the poor efficiency of the transmitting system and the remaining force acting on the brake shoe is often too small to produce a good braking action. In fact, known rim brakes rarely brake the associated wheels up to the jamb limit and thus are not capable of effecting an optimum braking range.

It has been proposed to obviate this disadvantage by increasing the efficiency and more particularly by increasing the transmission ratio of the system. However, the first proposition leads to expensive constructions in which the expenditure by no means corresponds to the obtained results, while the second proposal, namely the increase of the transmission ratio, is not possible in practice since the way of the operating handle is limited and a certain play is required at the brake shoes.

The present invention is based on the recognition that all mentioned disadvantages and difficulties may be obviated by increasing the efficiency of the wheel brake itself. According to the present invention this object is attained in that each friction pad or at least a part thereof is movably guided along a path forming an acute angle with the wheel plane. Other features and advantages of the invention will become apparent from the description now to follow, of preferred embodiments thereof, given by way of example only and in which reference will be made to the accompanying purely diagrammatical drawings in which:

FIGURE 1 is a plan view of a brake shoe articulated to a rocker arm of a tongs-like holder.

FIGURE 2 illustrates a modification of the brake shoe of FIGURE 1.

FIGURE 3 shows in a plan view brake shoes supported on the bicycle fork and mounted on a resiliently arranged tongs-like holder.

FIGURE 4 shows hinged rocker-arms adapted to be tilted into the wheel plane.

FIGURE 8 shows another embodiment of rocker-arms tiltable into the wheel plane and pivotable perpendicularly to this plane.

FIGURE 9 shows a partial section along the line IX—IX of FIGURE 10.

FIGURE 10 is a partial section along the line X—X of FIGURE 9.

FIGURE 11 is a section through the articulation of rocker-arms pivotable obliquely to the wheel plane.

FIGURES 12 and 13 show a third embodiment of rocker-arms tiltable into the wheel plane and pivotable perpendicularly to this plane, and FIGURE 14 is a section along the line XIV—XIV of FIGURE 13.

Figure 5:
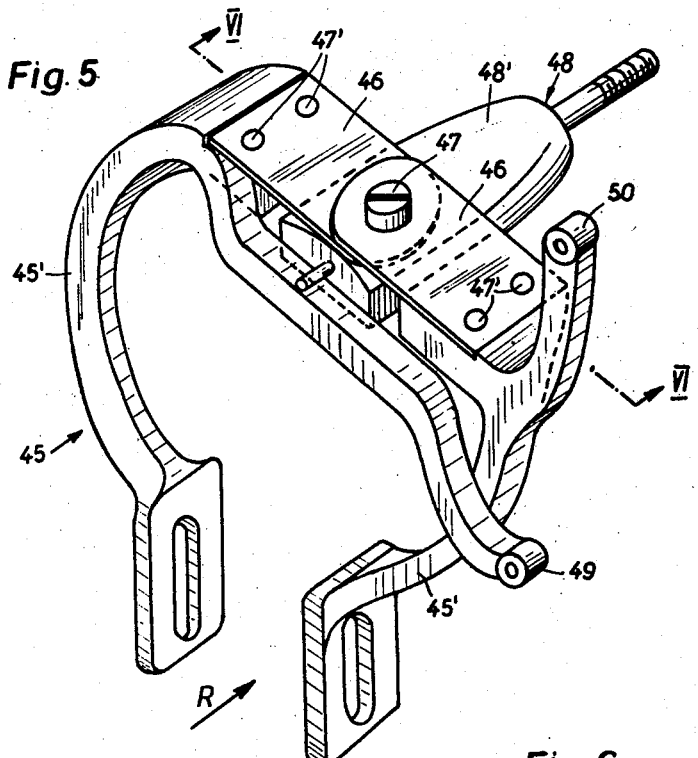
FIGURE 5 illustrates rocker-arms adapted to be tilted into the wheel plane and to be pivoted perpendicularly to the wheel plane.

In FIGURE 1, $S_1$ generally designates a brake shoe adapted to be secured to any brake tongs by means of a screw 1 by inserting the latter in a manner known per se into the slot 3 provided at the end of one jaw 2 of the tongs and by maintaining the screw in this position by a nut (not shown). The head of the screw 1 engages the web of a guide 4 having a U-shaped cross section. Between the legs of the guide 4 there is arranged a holder provided with friction pad 5 and this holder is pivotally arranged about an axle 7 extending between the legs of the guide 4. Thus, the friction pad 5 is articulated to the end of the jaw 2. A leaf spring 8 riveted to the web of the guide 4 engages with its free end a groove 9 of the holder 6 in order to maintain the latter in the illustrated position. In this position the operative surface 10 of the pad 5 extends in parallel to the rim (not shown) the direction of which is indicated by arrow R. On the forward end 11 the pad 5 is slightly curved. If now the brake shoe $S_1$ is applied in the direction of arrow Z, i.e. in the direction parallel to the axle of the wheel against the rim the frictional force also represented by arrow R produces a moment that tends to pivot the pad 5 and the holder 6 about the axle 7, and thereby increases the pressing action of the forward end of pad 5 against the rim. This additional pressure increases the braking action which therefore may attain high values with respect to the force of operation. In this manner it is possible to brake the wheel to a point very near to the jambing point. The value of the thus obtained self-reinforcement is independent from the lever arm of the moment produced by the frictional force R with respect to the axle 7, i.e. from the dimensions of the brake shoe and more particularly from the position of the axle 7. Preferably the arrangement is such that the self-reinforcement does not exceed a certain value so that a sensitive adjustment of the operating force is still possible and that variations of the coefficient of friction do not appear too strongly.

A somewhat modified embodiment of a brake shoe $S_2$ also having a braking block pivotably guided with respect to the wheel plane is shown in FIGURE 2.

In this embodiment too there is provided a holder guide designated by 12 and having a U-shaped cross section adapted to receive a holder 13 carrying the friction pad 5. In the rest position the holder bears against the web of the guide 12. In the zone of the rearward end of the pad 5 a lug 14 is provided at both sides of the holder 13 and these lugs cooperate with abutments obtained by bending the rim of the legs of guide 12 in order to prevent sliding of this end of the holder 13 out of the guide 12. In a widening 16 of the holder there is arranged a compressed body 17 of rubber or of a similar material under pre-tension. This body 17 loads the holder 13 against the abutments 14. The guide 12 has limiting lugs 18 and 19 overlapping the ends of the holder 13 in order to limit movements of the latter in direction of the arrow in the opposite direction. The arrangement is such that the holder 13 may be provided about the rounded supporting edge 20 of the guide 12, whereby the pressure body 17 is compressed. Similar to the embodiment described in the first instance the frictional force R here too produces a movement reinforcing the pressing action of the friction pad 5 onto the rim. It is to be understood that the friction cannot block the holder 13 in the guide provided that the material and the arrangement is appropriately chosen.

FIGURE 3 illustrates a rear-wheel rim brake of a bicycle in which the brake shoes S₃ are each provided with a holder 21 receiving the friction pad 5.

The holders 21 are supported on the arms 23 of the rear-fork of the bicycle over bearing surfaces 22 formed at their forward end with respect to the direction of arrow R and inclined outwardly and rearwardly. The brake shoes S₃ each are secured to the end of the rocker-arms 24′ of a tongs-like holder 24. The hinged rocker-arms are anchored to the connecting bridge 26 of the bicycle frame by means of a bolt 25 which simultaneously forms the hinge axle of the rocker-arms. Between the portion 25′ of the bolt 25 and the tongs 24 is arranged a resilient buffer 27 in form of a rubber block, pressure spring or the like. The buffer 27 presses the tongs against the nut 28 and thereby holds the rocker-arms 24′ in the illustrated position in spite of the fact that the borings for the bolt 25 have a large play and allow for example not only pivoting of the rocker-arms about but also against the bolts. With this arrangement the brake shoes are applied in the direction Z against the rim 29 whereby the frictional force R presses the bearing surfaces 22 against the fork arms 23. Owing to the play in the hinge of the tongs 24, the moment at the point of contact of the bearing surfaces with the forks may become active at the brake shoes and increase the pressing of the friction pads onto the rim. In this embodiment too a reinforcement is obtained which may take any desired value without impairing the sensitivity of the braking action. The brake shoes may also be articulated to the rocker-arms 24′ whereby the requirements of movability in the tongs' articulation may be reduced. In a modified embodiment the brake shoes could also be supported each by a lug articulated as well to the fork arms as also to the shoes and extending rearwardly in an angle from the fork arms towards the rim plane. In this embodiment the greater wear appearing generally at the forward end of the pads 5 may be substantially compensated, as owing to the wedge-shaped construction of the bearing surfaces 22 and to the inclination of the lugs also the rearward ends of the pads are strongly pressed against the rim.

In all preceding embodiments the brake shoes or at least a portion thereof are movably guided along a path forming an angle with the rim plane and converging thereby in the direction of the frictional force In the embodiment of FIGURE 1 for example, the forward end of the shoes extends along an arc about the axle 7. In the second and in the third embodiment the forward ends of the shoes follow similar paths about their supporting parts. Also the rearward ends may follow a path determined for example by the surfaces 22 or the mentioned lugs respectively. With some further modifications it shall now be shown that the path of movements of the brake shoes may not only be obtained by a movable fastening of the brake shoes at the rocker-arms but also by an appropriate anchoring of the rocker-arms.

Figure 7:
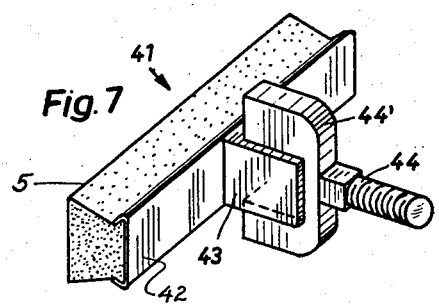
FIGURE 7 shows a hinged brake shoe.

According to FIGURE 4 for example, the rocker-arms 30′ of tongs 30 are each pivotably arranged about an axle 31 advantageously directed radially with respect to the wheel to be braked. The axles 31 are lodged in a web 32 engaging forks provided at the ends of the rocker-arms 30′. This web 32 replaces the bolt generally used for anchoring the wheel brake at the bicycle frame. By engaging the said forks the web 32 prevents pivotal movements of the rocker-arms 30′ other than about the axles 31 so that the stresses on the latter are reduced. To the same end bearing lugs 33 provided at the ends of the rocker-arms 30′ supportably bear against the lower side of the web 32. At each rocker-arm a clamping sleeve 34 is provided and a clamping screw 35 is screwed into each of these sleeves. These clamping members serve to clamp the two ends of a short connecting cable 36 connected with the end of a pull-cable over a slide piece 37. The cable is guided in a mantle 39 bearing against a lug 32′ of the web 32 and is connected at its other end with an actuating handle (not shown) for the brake. A slot 40 serving to secure the friction pad of the brake is provided at the free ends of the rocker-arms 30′. For example the brake shoes used with the embodiment of FIGURE 4 may be similar to that represented in FIGURES 1, 2 and 7. In the last-mentioned brake shoes 41 the holder 42 carrying the pad 5 has an eyelet 43 articulated in the forked head 44′ of a fastening screw 44. The eyelet 43 may be provided in the middle of the holder or may be eccentric thereto.

The tongs 30 provided with one of the described brake shoes operate as follows:

If a pull is exerted to the cable 38 the rocker-arms 30′ are pivoted about their axles 31 until the friction pads of the brake shoes come to lie against the rim. By increasing the pull action at the cable 38 the pads are pressed against the rim and a primary braking effect is produced. Now the frictional force acting at the pads tends to further pivot the rocker-arms 30′ against the rim thus leading to the desired reinforcing of the braking action. The bearing of the rocker-arms on the lugs 33 takes over the undesired moments produced by the frictional force. If the brake is released the jaws 30′ are maintained in their illustrated positions by return springs (not shown).

Figure 6:
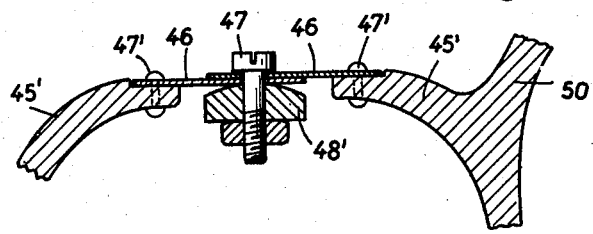
FIGURE 6 is a section taken along the line VI—VI of FIGURE 5.

FIGURES 5 and 6 illustrate a similar embodiment. The rocker-arms 45′ of the tongs 45 are each riveted to a spring leaf 46 by rivets 47′. The two springs 46 are articulated by a screw 47 to the widened head 48′ of bolt 48, the screw forming the common axle of rotation of the two leafs 46 advantageously being directed radially with respect to the wheel to be braked. Thus, the rocker-arms 45′ may, as described for the rocker-arms 30′ in the preceding embodiment, be pivoted about the axle of rotation so as to come to lie against the wheel plane. The applying of the brake shoes articulated to the rocker-arms 45′ as already described or at least resiliently held therein to the rim is effected in this embodiment not by the mentioned pivoting of the rocker-arm 45′ about the axle 47 but by a tong-like clamping of the rocker-arms 45 by means of tensioning levers 49 and 50 under deformation of the springs 46 as is already known. As soon however, as the brake shoes are applied and pressed to the rim in this manner the frictional force acting in direction of arrow R produces a pivoting of the rocker-arms 45′ about their axle 47, whereby the pressure of the brake shoes against the rim and thus the braking action is increased. In this embodiment too the resulting brake force is a function of the force of actuation and if the self-reinforcement is chosen appropriately the sensitivity of the actuation is fully maintained. The leaf springs 46 may easily and without further support receive the moments produced by the friction.

The embodiments of FIGURES 8, 9 and 10 work in a similar manner. The tongs 51 are secured through a screw bolt 52 fixed at the bicycle frame and retained by a nut 53. The end portions of the rocker-arms 51′ to be anchored each carry a semi-circular flange 54 arranged in spaced relationship with respect to the jaws and connected therewith through a segment-shaped web 55 particularly appearing in FIGURE 10. In this manner at the end of each rocker-arm 51′ there is formed a guiding groove 56 co-axial with the bolt 52 and having a base of semi-circular shape as shown at 56 in FIGURE 9. At the end faces of the jaws 51′ facing the bolt 52 there are provided semi-cylindrical recesses 57 forming a bearing for the bolt 52. An axle 58 engages each guiding groove 56 and these axles 58 are maintained spaced from the bolt 52 in such manner that the ends of the rocker-arms 51′ are held against the bolt by the axles 58. Thus, the rocker-arms 51′ form a tongs-like arrangement about the bolt 52. Moreover, each rocker-arm 51′ may also be pivoted about its axle 58 since the recesses 57 are widened as shown at 57′. The axles 58 are maintained at both their ends in eyelets 59′ of a bridge 59 mounted on the bolt 52 and pressed against the lateral surfaces of the ends of the rocker-arms 51′ by a vaulted disc spring 60. Care is taken in a manner not shown that the bridge 59 cannot rotate in the represented position in which the axles 58 extend approximately radially with respect to the wheel to be braked. The disc spring 60 by its action onto the ends of the rocker-arms 51′ keeps the latter in the illustrated position in which they lie in a common plane. Of course this arrangement does not make superfluous the usual return springs but the latter have not been shown for the sake of clarity. Against the action of these return springs the closing movement of the rocker-arms 51′ may be effected by levers 61 and 62 and a cable co-operating in a manner not shown but well known with these levers.

The free ends of the rocker-arms 51′ are forked. A screw 64 extends between the spaced legs 63′ and 63″ of the forks 63 and this screw is screwed into a blind-boring of the leg 63′ until the screw heads tightly lie against the legs 63″. The screws 64 traverse a threaded boring of lugs 65 rigidly connected with a holder 66 for the friction pads 5. In this manner the rocker-arms 51′ are provided with movably secured brake shoes adjustable in height.

By pressing the pads 5 against the rim a frictional force effective in direction of arrow R is produced and this force tends to pivot the rocker-arms 51′ about their axles 58. This leads to a reinforcement of the pressure of the pads against the rim. The actuation, as in the preceding embodiments, remains sensitive in spite of the increase of the braking force by self-reinforcement.

In the embodiments of FIGURES 5 and 8 the rocker-arms are adapted to be pivoted about a hinge and in addition thereto they may be tilted in direction of the frictional force R out of their common plane.

It is to be understood that several other constructions of articulations may be suitable to permit such movements of the rocker-arms. Not only may articulation be provided about a single axis but articulation about a pair of axes, i.e. universal articulation, may be used whereby the latter must of course be provided with supporting means preventing movements of the rocker-arms about an axis parallel to the wheel axis as in all other embodiments. In each case the brake shoes are movably arranged in such manner at the ends of the rocker-arms that even when the rocker-arms are tilted out of their common plane they remain applied against the rim.

This may be obtained not only by articulations having one axle but also by articulations combined with resilient intermediate layers and blocks or by using exclusively such blocks.

A further embodiment of the invention is illustrated in FIGURE 11. The two rocker-arms 67′ of tongs 67 are pivotable about an axle 68. The axles 68 diverging in direction of arrow R, i.e. in direction of the wheel to be braked, extend between a pair of bearing blocks 70 and 71 spacedly arranged one behind the other and secured to the bicycle frame through a bolt 69. The bearing blocks 70 and 71 form a guiding for the rocker-arms arranged between them. The rocker-arms 67′ are provided with resiliently arranged brake shoes adapted to bear perfectly against the rim when the rocker-arms 67′ are clasped in known manner. Since the brake shoes are guided in a path forming an acute angle with the wheel plane the movement of the brake shoes may be decomposed into a component parallel to the wheel plane and into a second component perpendicular to the first component. The frictional force R acts in the direction of the component extending in parallel to the wheel plane and thereby reinforces the component perpendicular to the wheel plane. The brake shoes thus are entrained in the direction of braking and the braking action is reinforced as in the preceding examples.

The brake represented in FIGURES 12 and 13 corresponds principally to the embodiments of FIGURES 5 and 8 in that it comprises tongs 72 having rocker-arms 72′ and 72″ hinged to a bolt 73 for pivotal movements in a direction perpendicular to the wheel plane and for tilting movements out of this plane in direction of the frictional force. To this end the openings in the ends of the rocker-arms 72′ and 72″ through which the bolt extends are not closely fitting but rather have substantial play about the bolt.

The tilting movement in the direction of arrows $P_2$ (FIG. 13) may also be effected independently of the pivotal movement (see arrows $P_1$ in FIGURE 12).

The ends of the rocker-arms 72′ and 72″ which as visible in FIGURE 13 are lens-shaped are supported one on the other over a pair of bearing lugs 74 of the jaw 72″ protruding forwardly above and below the bolt 73 and a pair of lugs 75 (FIGURE 14) arranged each at the same level with a supporting lug 74 at the portion 73′ of the bolt 73. The ends of the supporting lugs 74 resting on the lugs 75 are rounded whereby this rounding and simultaneously the lens-shape of the ends of the rocker-arms is such that the rocker-arms forcibly effect a well-defined tilting movement about a common axis for example. In addition to the described arrangement the lens-shaped ends of the rocker-arms are mounted between a pair of discs 76 and 77 mounted on the bolt whereby disc 76 is supported by a nut 78 screwed onto the end of the bolt while disc 77 is supported by a rubber sleeve 79. The ends of a pair of tensioning levers 80 and 81 engage between the rubber sleeve 79 and the portion 73′ and these levers are arranged for tiltable movement out of their common plane on a vertical axle 82 extending between the lugs 75 and connecting same. From FIGURE 14 it appears that the stepped ends of the levers 80 and 81 respectively reach over and below the bolt so that these levers connected with the lug 75 also form a unit pivotable in a plane perpendicular to the wheel plane about the bolt 73.

The end of the relatively short lever 80 is supported on a part 83 extending forwardly from the upper terminal zone of the rocker-arm 72′. The lever 81 is guided along the rocker-arm 72″ and in parallel thereto in downwardly bent direction and carries at its lower end a clamping screw 84 as well as a clamping sleeve 85 for seizing the end of the operating cable 86. The latter is guided in usual manner in a Bowden mantle 87 the end of which is held in a holder 88 screwed to the rocker-arm 72″. The length of the holder extending forwardly and thus in direction of the frictional force R is chosen such that the point of engagement of the mantle 87 at the holder 88 and thus at the jaw 72″ is shaped forwardly of the plane of the latter.

The described brake is centered with respect to the wheel by means of a spring 89 clamped in a recess of disc 76 and having its ends anchored each at a rocker-arm as at 90. It is to be understood that thereby the disc 76 is secured against rotation about the bolt 73 in a manner known per se. The spring 89 in the described arrangement simultaneously serves as a return spring for the rocker-arms 72′ and 72″ as well with respect to the feeding movement as also with respect to the tilting movement thereof. Moreover, the spring 89 over the support 83 serves as a return spring for the unit formed by the levers 80, 81 supported in this as far as the tilting movement is concerned by the rubber sleeve 79 exerting an axial pressure onto the ends of the levers and thus producing a return moment.

The braking movement of the rocker-arm 72″ is directly effected under the action of the cable mantle 87 while rocker-arm 72′ is indirectly moved by a force exerted to the support 83 by pivoting the unit formed by the levers 80, 81. As soon as the brake shoes $S_2$ come to act on the rim the produced frictional force exerts a tilting moment with reference to the common tilting axle of the rocker-arm as indicated by the arrow $P_2$. This moment, the dimension of which is adjustable by changing the force of operation increases the pressure of the brake shoes and thus under the action of the sensitive operation the braking action.

Simultaneously, however, the frictional force produces a further moment tending to pivot the rocker-arms about an axis parallel to the wheel axle, i.e. in the sense of arrow $P_3$. This relatively large moment must be taken up in known brakes by the bolt alone resulting in a stress and in a stiffening of the articulation of the tongs. In the described brake the cable mantle 87 exerts over the holder 88 a tilting moment onto the rocker-arm 72" and the end of the lever 80 over the support 83 onto the rocker-arm 72' acting oppositely to the moment mentioned before and acting in direction of arrow $P_3$ so that the influence of the latter is practically compensated. Thus, the articulation of the rocker-arm remains free from any additional load and the braking action remains free of losses which otherwise might stiffen the articulation. The unloading of the rocker-arm's articulation could of course also be obtained by directly anchoring the rocker-arms with respect to the moment acting in direction of arrow $P_3$.

The bearing of the levers 80 and 81 at the axles 82 renders possible an unhindered tilting of the rocker-arms. The same could also be attained with only one two-armed lever including the parts 80 and 81 provided that such a lever is resiliently arranged in direction of the frictional force R, whereby of course such a lever would have to be arranged so as to be pivotable about the bolts 73.

Using the principles shown with regard to the described and illustrated embodiments it is to be understood that a great number of wheel brakes may be realized in which by a corresponding guiding of the brake shoes and/or of the rocker-arms the frictional force reinforces the pressure exerted by the brake shoes onto the rim so that in addition to the braking action directly exerted by human force a further braking force is realized which is produced by the friction but is influenced and depends on the force of actuation of the brake.

I claim:

1. A rim brake of the type having brake shoes, said rim brake comprising friction pads oppositely arranged and adapted for cooperating in a jaw-like manner to engage the rim whereby said friction pads exert a friction force on said rim in a determinable direction, a tongs-like holder including rocker arms supporting the brake shoes, resilient means operatively coupled to the rocker arms to maintain the friction pads normally displaced from said rim, means for actuating the rocker-arms against the force of the resilient means, and means supporting said rocker arms for pivotal movement limited substantially solely by engagement of said pads with said rim and about axes aligned approximately radially with respect to said rim, each of said friction pads being thereby pivotally guided about a pivoting axle approximately perpendicular to the direction of friction.

2. A rim brake of the type having brake shoes, said rim brake comprising friction pads oppositely arranged and adapted for cooperating in a jaw-like manner to engage the rim whereby said friction pads exert a friction force on said rim in a determinable direction, a tongs-like holder including rocker arms supporting the brake shoes, support means pivotally supporting said arms for movement at substantially a right angle to the rim, resilient means operatively coupled to the rocker arms to maintain the friction pads normally displaced from said rim, and control means for actuating the rocker-arms against the force of the resilient means, said support means further supporting said rocker arms for pivotal movement, limited substantially solely by engagement of the pads with the rim, about axes generally radially disposed the rim, so that said friction pads are guided in converging directions against the rim by the rocker arms due to frictional engagement of the pads with said rim.

3. A rim brake as claimed in claim 2, wherein said support means includes a bolt on which said rocker arms are pivoted and further comprising a lever mounted on said bolt and coupling said control means to one of said rocker arms, said lever including two arms and means connecting the arms for relative pivotal movement about at least one axis perpendicular to said bolt.

4. A rim brake as claimed in claim 2, wherein said rocker arms include lens-shaped extremities supported by said support means and in engagement with one another to permit said pivotal movement about the radially disposed axes.

References Cited in the file of this patent

FOREIGN PATENTS

| | | |
|---|---|---|
| 900,660 | France | Oct. 16, 1944 |
| 904,471 | France | Mar. 5, 1945 |